(12) United States Patent
Kurome et al.

(10) Patent No.: US 12,710,303 B2
(45) Date of Patent: Aug. 18, 2026

(54) INTERFACE POSITION DETERMINING APPARATUS AND METHOD

(71) Applicant: MITSUBISHI HEAVY INDUSTRIES, LTD., Tokyo (JP)

(72) Inventors: Kazuya Kurome, Tokyo (JP); Nariaki Negishi, Tokyo (JP); Takeshi Kodaira, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 459 days.

(21) Appl. No.: 17/281,381

(22) PCT Filed: Jun. 17, 2019

(86) PCT No.: PCT/JP2019/023876
§ 371 (c)(1),
(2) Date: Mar. 30, 2021

(87) PCT Pub. No.: WO2020/136945
PCT Pub. Date: Jul. 2, 2020

(65) Prior Publication Data

US 2022/0034703 A1 Feb. 3, 2022

(30) Foreign Application Priority Data

Dec. 28, 2018 (JP) ................................ 2018-247452

(51) Int. Cl.
*G01F 23/296* (2022.01)

(52) U.S. Cl.
CPC ................................ *G01F 23/2961* (2013.01)

(58) Field of Classification Search
CPC .................................................. G01F 23/2961
See application file for complete search history.

(56) References Cited

U.S. PATENT DOCUMENTS 3,958,451 A * 5/1976 Richardson .......... G01N 29/223
73/644
4,008,603 A * 2/1977 Paulissen .............. G01N 29/07
73/901

(Continued)

FOREIGN PATENT DOCUMENTS

JP H04-36620 A 2/1992
JP H08-101058 A 4/1996

(Continued)

OTHER PUBLICATIONS

International Search Report dated Jul. 16, 2019, issued in counterpart application No. PCT/JP2019/023876. (2 pages).

*Primary Examiner* — John E Breene
*Assistant Examiner* — Alex T Devito
(74) *Attorney, Agent, or Firm* — WHDA, LLP

(57) ABSTRACT

All interface position determining apparatus includes a transmitter that transmits an acoustic wave from a plurality of positions in an accumulating direction in which impurities contained in a liquid accumulate, from an outside of a wall surrounding the liquid; a receiver that receives the acoustic wave transmitted from the transmitter at a plurality of positions; and a determining unit that determines a position of an interface between a liquid layer and a sludge layer in the accumulating direction based on a condition of the acoustic wave received by the receiver.

9 Claims, 4 Drawing Sheets

(56) References Cited

U.S. PATENT DOCUMENTS

| | | | | |
|---|---|---|---|---|
| 4,144,517 | A * | 3/1979 | Baumoel | G01F 23/2961 73/290 V |
| 4,320,659 | A * | 3/1982 | Lynnworth | G01H 15/00 73/290 V |
| 4,679,430 | A * | 7/1987 | Scott-Kestin | G01F 23/2965 73/290 V |
| 2012/0287749 | A1 * | 11/2012 | Kutlik | G01F 23/2962 73/290 V |
| 2014/0008304 | A1 | 1/2014 | Jansen et al. | |
| 2016/0169839 | A1 | 6/2016 | Gottlieb et al. | |

FOREIGN PATENT DOCUMENTS

| | | | | |
|---|---|---|---|---|
| JP | H10-9932 A | | 1/1998 | |
| JP | 2000028421 | * | 1/2000 | |
| JP | 2002-340654 A | | 11/2002 | |
| WO | WO-2009063194 A2 | * | 5/2009 | G01F 23/2961 |

* cited by examiner

INTERFACE POSITION DETERMINING APPARATUS AND METHOD

FIELD

The present invention relates to an interface position determining apparatus and method for determining a position of an interface between a liquid layer and a sludge layer.

BACKGROUND

In an offshore oilfield, for example, crude oil extracted by excavating the seafloor is stored in a tank. The crude oil stored in the tank is heated and distilled in a refinery facility. In other words, the crude oil is separated into petroleum products such as petroleum gas, gasoline (naphtha), kerosene, diesel fuel, heavy fuel oil, and asphalt, by taking advantage of the difference in their boiling points.

The crude oil, in a process of being extracted from the seafloor, has impurities such as soil and gravels mixed thereinto. The impurities accumulate in the tank while the crude oil stored in the tank is heated and distilled in the refinery facility while the crude is being supplied into the tank. If a large amount of impurities accumulate in the tank, the refining operation is obstructed. Therefore, the refining operation is stopped, and a cleaning operation for removing the impurities accumulated in the tank is carried out regularly.

CITATION LIST

Patent Literature

Patent Literature 1: Japanese Patent Application Laid-open No. 2002-340654

SUMMARY

Technical Problem

Although the tank cleaning operation is carried out regularly, the amount of impurities accumulated inside is not known, and if the operation for cleaning inside the tank is carried out when the accumulated amount is not very much, the operation efficiency of the refining operation is low. Therefore, there has been a demand for measuring the accumulated amount of impurities accumulated inside of the tank from the outside. For example, in the acoustic liquid level detecting method and apparatus disclosed in Patent Literature 1, an acoustic wave transceiver transmits an acoustic wave toward a container, receives the wave reflected on the gaseous phase or the solid phase included in the liquid phase inside of the container, and detects the liquid level stably based on the reflected wave. However, in a liquid that contains impurities, an interface formed between a liquid layer and a sludge layer is not as clean as that formed between a liquid layer and an air layer, and there is an intermediate layer containing a mixture of the liquid and the impurities, between the liquid layer and the sludge layer. Therefore, it has been difficult to detect the position of the interface between the liquid layer and the sludge layer highly accurately.

The present invention is made to address the issue described above, and an object of the present invention is to provide an interface position determining apparatus capable of detecting the position of the interface between a liquid layer and a sludge layer highly accurately.

Solution to Problem

In order to achieve the object, an interface position determining apparatus includes a transmitter that transmits an acoustic wave from a plurality of positions in an accumulating direction in which impurities contained in a liquid accumulate, from an outside of a wall surrounding the liquid; a receiver that receives the acoustic wave transmitted from the transmitter at a plurality of positions; and a determining unit that determines a position of an interface between a liquid layer and a sludge layer in the accumulating direction based on a condition of the acoustic wave received by the receiver.

Therefore, when the transmitter transmits an acoustic wave from a plurality of positions in the direction in which the impurities accumulate, the receiver receives the acoustic wave transmitted from the transmitter at a plurality of positions, and the determining unit determines the position of the interface between the liquid layer and the sludge layer in the direction in which the impurities accumulate, based on the condition of the acoustic wave received by the receiver. Therefore, the position of the interface between the liquid layer and the sludge layer of the liquid inside a container, a pipe, or the like can be detected from the outside highly accurately.

In the interface position determining apparatus according to the present invention, the determining unit compares the condition of the acoustic wave received by the receiver with a condition of a preset reference acoustic wave to determine the position of the interface between the liquid layer and the sludge layer.

Therefore, since the determining unit determines the position of the interface between the liquid layer and the sludge layer by comparing the condition of the received acoustic wave with the condition of the reference acoustic wave, the position of the interface can be determined easily.

In the interface position determining apparatus according to the present invention, the determining unit detects a transition layer where the liquid is mixed with impurities, and that is present between the liquid layer and the sludge layer, based on the condition of the acoustic wave received by the receiver, and defines the position of the interface between the liquid layer and the sludge layer by using the transition layer.

Therefore, since the determining unit detects the transition layer based on the condition of the received acoustic wave, and defines the position of the interface between the liquid layer and the sludge layer using the transition layer, the position of the interface between the liquid layer and the sludge layer can be detected highly accurately even when there is a transition layer between the liquid layer and the sludge layer.

In the interface position determining apparatus according to the present invention, the determining unit compares the condition of the acoustic wave received by the receiver with a condition of a preset reference acoustic wave corresponding to the transition layer to determine the position of the interface between the liquid layer and the sludge layer.

Therefore, since the determining unit determines the position of the interface between the liquid layer and the sludge layer by comparing the condition of the received acoustic wave with the condition of the reference acoustic wave corresponding to the transition layer, the position of the interface can be determined easily.

In the interface position determining apparatus according to the present invention, the determining unit defines the position of the interface by dividing the transition layer into a plurality of layers in the accumulating direction in which impurities accumulate.

Therefore, since the determining unit defines the position of the interface by dividing the transition layer into a plurality of layers in the direction in which the impurities accumulate, the position of the interface can be determined highly accurately.

In the interface position determining apparatus according to the present invention, the determining unit determines the position of the interface between the liquid layer and the sludge layer based on at least one of an interval between acoustic waves received by the receiver and a level of an acoustic wave received by the receiver.

Therefore, since the determining unit determines the position of the interface between the liquid layer and the sludge layer based on the interval or the level of the received acoustic wave, the position of the interface can be determined easily.

In the interface position determining apparatus according to the present invention, a plurality of sets each of which includes the transmitter and the receiver are arranged at given intervals in a vertical direction, on an outer surface of a container in which the liquid is stored.

Therefore, since a plurality of sets each of which the transmitter and the receiver are arranged on the outer surface of the container, at given intervals in the vertical direction, the position of the interface can be determined easily within a shorter time period.

In the interface position determining apparatus according to the present invention, the transmitter and the receiver are arranged movably along a vertical direction, on an outer surface of a container in which the liquid is stored.

Therefore, since the transmitter and the receiver are provided movably along the vertical direction on the outer surface of the container, it is not necessary to provide a plurality of the transmitters and the receivers, so that it is possible to achieve cost reductions.

In the interface position determining apparatus according to the present invention, the liquid is crude oil, and the container is a heat exchanger for refining the crude oil.

Therefore, the position of the interface between the liquid layer and the sludge layer of the crude oil stored in the container of the heat exchanger can be detected from the outside highly accurately.

In the interface position determining apparatus according to the present invention, a plurality of sets each of which includes the transmitter and the receiver are arranged in a circumferential direction, at given intervals, on an outer surface of a pipe through which the liquid flows.

Therefore, since a plurality of sets each of which the transmitter and the receiver are arranged in the circumferential direction, on the outer surface of a pipe through which the liquid flows, at given intervals, the position of the interface can be determined easily within a shorter time period.

The interface position determining apparatus according to the present invention includes a display unit that displays that the position of the interface determined by the determining unit reaches an upper bound position preset in the accumulating direction in which impurities accumulate.

Therefore, since the display unit is caused to display that the position of the interface reaches the upper bound position, a worker can recognize the operation for cleaning the impurities at an early stage.

Further, an interface position determining method according to the present invention includes the steps of: transmitting an acoustic wave from a plurality of positions in an accumulating direction in which impurities contained in a liquid accumulate, from outside a wall surrounding the liquid; receiving the transmitted acoustic wave at a plurality of positions; and determining a position of an interface between a liquid layer and a sludge layer in the accumulating direction based on a condition of the received acoustic wave.

Therefore, the position of the interface between the liquid layer and the sludge layer of the liquid inside a container, a pipe, or the like can be detected from the outside highly accurately.

Advantageous Effects of Invention

With the interface position determining apparatus and method according to the present invention, the position of the interface between the liquid layer and the sludge layer can be detected highly accurately.

DESCRIPTION OF EMBODIMENTS

An interface position determining apparatus and method according to some preferred embodiments of the present invention will now be explained in detail with reference to the appended drawings. However, these embodiments are not intended to limit the scope of the present invention, and when a plurality of embodiments are included herein, any combination thereof fall within the scope of the present invention.

First Embodiment

Figure 1:
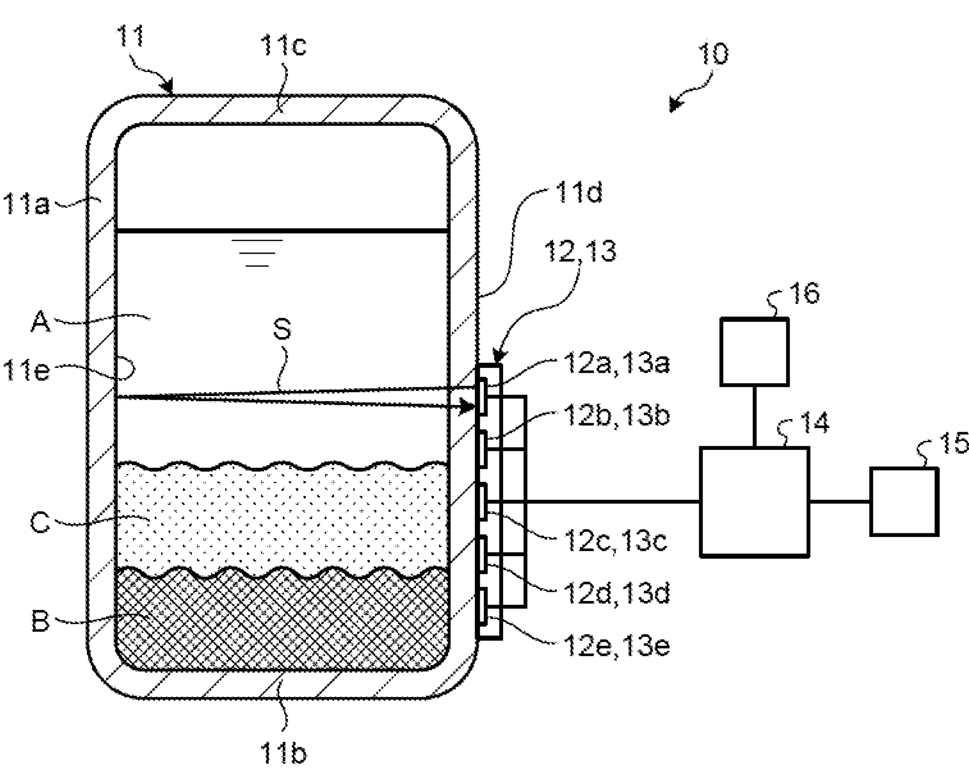
FIG. 1 is a schematic illustrating a general structure of an interface position determining apparatus according to a first embodiment.

FIG. 1 is a schematic illustrating a general structure of an interface position determining apparatus according to a first embodiment.

For example, in an offshore oilfield, crude oil is extracted by excavating the seafloor. This crude oil is separated into petroleum products such as petroleum gas, gasoline (naphtha), kerosene, diesel fuel, heavy fuel oil, and asphalt, by being heated and distilled in the refinery facility. However, impurities such as soil and gravels get into the crude oil in the excavation process. As the crude oil stored in a tank is heated and distilled in the refinery facility while supplying the crude oil into the tank, the impurities gradually accumulate in the tank. Therefore, when a given amount of impurities accumulate in the tank, the refining operation is stopped, and a cleaning operation for removing the impurities accumulated in the tank is carried out.

In the first embodiment, as illustrated in FIG. 1, this interface position determining apparatus 10 is configured to determine a position of an interface between a liquid layer A and a sludge layer B of the crude oil (liquid) stored inside a tank (container) 11, in the direction in which the impurities accumulate. As a result of determining the position of the interface between the liquid layer A and the sludge layer B of the crude oil inside of the tank 11, if the interface position has reached a preset given position (height), the interface position determining apparatus 10 provides display of carrying out a cleaning operation of the tank 11. This tank 11 is a tank that constitutes a heat exchanger in the crude oil refinery facility, to which crude oil is supplied, so as to be heated and distilled.

The tank 11 includes a cylindrical side 11*a* having a bottom 11*b* provided on the bottom thereof, and a ceiling 11*c* provided on the top thereof, and is provided with a crude oil supplying unit and a distillate discharging unit, which are not illustrated.

The interface position determining apparatus 10 includes a transmitter 12, a receiver 13, a determining unit 14, a storage unit 15, and a display unit 16. The transmitter 12 includes a plurality of (five, in this embodiment) transmitting units 12*a*, 12*b*, 12*c*, 12*d*, 12*e*, and the transmitter 12 includes the transmitting units 12*a*, 12*b*, 12*c*, 12*d*, 12*e* arranged serially, in a manner lined up along a straight line. The transmitter 12 is fixed to the outer surface of the tank 11. At this time, the transmitter 12 has the transmitting units 12*a*, 12*b*, 12*c*, 12*d*, 12*e* arranged in a vertical direction, that is, arranged along the direction in which the impurities accumulate, at given intervals.

The receiver 13 is provided integrally with the transmitter 12. In other words, the receiver 13 includes a plurality of (five, in this embodiment) receiving units 13*a*, 13*b*, 13*c*, 13*d*, 13*e*, in the same manner as the transmitter 12, and the receiver 13 has the receiving units 13*a*, 13*b*, 13*c*, 13*d*, 13*e* arranged serially, in a manner lined up along a straight line. The receiver 13 is fixed to the outer surface of the tank 11. The receiver 13 has the receiving units 13*a*, 13*b*, 13*c*, 13*d*, 13*e* arranged in the vertical direction, that is, arranged along the direction in which the impurities accumulate, at given intervals.

The transmitter 12 transmits ultrasonic wave (acoustic waves) S from a plurality of positions in the direction in which the impurities contained in the crude oil accumulate. The receiver 13 receives the ultrasonic wave (acoustic waves) S transmitted from the transmitter 12 at a plurality of positions. In other words, the transmitter 12 transmits the ultrasonic wave S from the outside toward the inside of the tank 11 from a plurality of positions, in a horizontal direction perpendicular to the outer surface 11*d* of the side 11*a*. Part of the ultrasonic wave S is reflected on the outer surface 11*d* of the side 11*a*, and the receiver 13 receives the ultrasonic wave S reflected on the outer surface lid of the side 11*a* as a primary reflected wave S1. The remaining ultrasonic wave S transmitted from the transmitter 12 passes through the side 11*a*, travels straight through the inside of the tank 11, and is reflected on the inner surface 11*e* of the side 11*a* on the opposite side. The receiver 13 then receives the ultrasonic wave S reflected on the inner surface 11*e* of the side 11*a*, as a secondary reflected wave S2.

The determining unit 14 determines the position of the interface between the liquid layer A and the sludge layer B, based on the condition of the ultrasonic wave S received by the receiver 13. Specifically, the determining unit 14 determines the position of the interface between the liquid layer A and the sludge layer B by comparing the condition of the ultrasonic wave S received by the receiver 13 with the condition of a preset reference ultrasonic wave Sa. The determining unit 14 may also determine the position of the interface between the liquid layer A and a gaseous layer above the liquid layer A. The condition of the ultrasonic wave S herein means the interval between the ultrasonic waves S, that is, the interval (time length) between the primary reflected wave S1 and the secondary reflected wave S2. The condition of the ultrasonic wave S also means the level of the ultrasonic wave S, that is, the levels (magnitudes) of the primary reflected wave S1 and the secondary reflected wave S2. In this case, the determining unit 14 may use at least one of, but may also use both of the interval between the ultrasonic waves S and the level of the ultrasonic wave S, as the condition of the ultrasonic wave S.

The condition of the reference ultrasonic wave Sa means the condition of the ultrasonic wave S (the interval between the ultrasonic waves S, the level of the ultrasonic wave S) in the sludge layer B in the liquid layer A of the crude oil inside the tank 11, and are acquired in advance, based on experiments, for example. The storage unit 15 stores therein a reference condition of the liquid layer A and a reference condition of the sludge layer B. The determining unit 14 determines the position of the interface between the liquid layer A and the sludge layer B, by comparing the condition of the ultrasonic wave S received by the receiver 13 with the condition of the reference ultrasonic wave Sa stored in the storage unit 15.

The display unit 16 displays the determination result determined by the determining unit 14. The display unit 16 displays the position (height) where the interface between the liquid layer A and the sludge layer B is located in the tank 11. The upper bound interface position at which a cleaning operation of the tank 11 is needed, that is, the upper bound height of the sludge layer B is set in advance, and the determining unit 14 then determines whether the current interface position between the liquid layer A and the sludge layer B in the tank 11 has reached the upper bound position of the interface position at which the cleaning operation is needed. If the position of the interface has reached the upper bound position, a display is made on the display unit 16. The determining unit 14 may also be configured to issue an alarm when the position of the interface has reached the upper bound position.

Furthermore, since the crude oil in the tank 11 contains impurities, the sludge layer B gradually becomes formed on the bottom, but an intermediate layer (hereinafter, referred to as a transition layer) C where the crude oil is mixed with the impurities is formed between the liquid layer A and the sludge layer B. The determining unit 14 detects the transition layer C that is present between the liquid layer A and the sludge layer B, based on the condition of the ultrasonic wave S received by the receiver 13, and defines the position of the interface between the liquid layer A and the sludge layer B using the transition layer C. In other words, the determining unit 14 determines the position of the interface between the liquid layer A and the sludge layer B by comparing the condition of the ultrasonic wave S received by the receiver 13 with the condition of the preset reference ultrasonic wave Sa corresponding to the transition layer C. In this case, the determining unit 14 defines the position of the interface by dividing the transition layer C into a plurality of layers in the direction in which the impurities accumulate.

Figure 2:
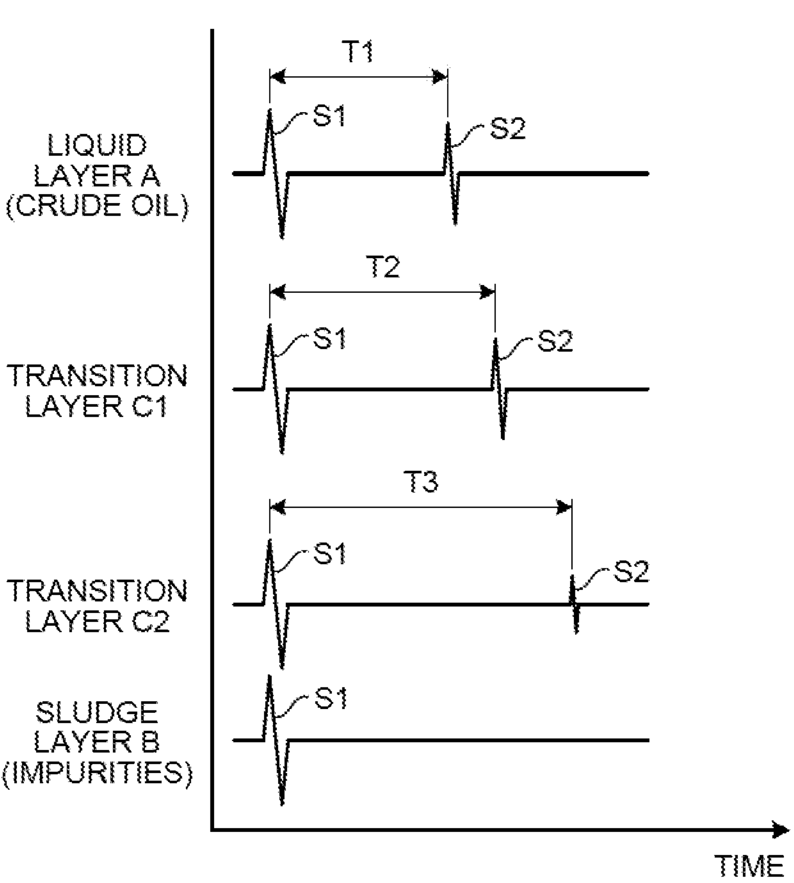
FIG. 2 is a general schematic illustrating received waves from a liquid layer, a transition layer, and a sludge layer.

A method for determining the position of the interface between the liquid layer A and the sludge layer B performed by the interface position determining apparatus 10 will now be explained. FIG. 2 is a general schematic illustrating the received waves from the liquid layer A, the transition layer C, and the sludge layer B.

The ultrasonic wave S is a high-frequency elastic wave propagating through an elastic body such as gas, liquid, or solid, and its speed varies depending on the gas, the liquid, or the solid. As illustrated in FIG. 2, T1 denotes the interval (tine length) between the primary reflected wave S1 and the secondary reflected wave S2 included in the ultrasonic wave S received by the receiver 13 via the liquid layer A of the crude oil. T2 denotes the interval (time length) between the primary reflected wave S1 and the secondary reflected wave S2 in the ultrasonic wave S received by the receiver 13 via a transition layer C1 of the crude oil, and T3 denotes the interval (time length) between the primary reflected wave S1 and the secondary reflected wave S2 included in the ultrasonic wave S received by the receiver 13 via a transition layer C2.

The transition layer C1 is an upper layer of the transition layer C, and the transition layer C2 is a lower layer of the transition layer C. A larger amount of impurities is mixed in the transition layer C2. Therefore, the position of the interface between the transition layer C1, which is the upper layer and the transition layer C2, which is the lower layer is defined as the position of the interface between the liquid layer A and the sludge layer B. Furthermore, the secondary reflected wave S2 cannot be received via the sludge layer B, or only received is the secondary reflected wave the magnitude of which is extremely low. In this example, two transition layers C1, C2 are set to the transition layer C, but three or more transition layers may also be set.

The following relation is then established among the intervals (time lengths) T1, T2, and T3 between the primary reflected wave S1 and the secondary reflected wave S2 included in the ultrasonic wave S received by the receiver 13.

$$T1 < T2 < T3$$

In other words, it can be seen that the propagation speed in the sludge layer B that is the impurities is lower, than that in the liquid layer A that is crude oil. Furthermore, it can be seen that the propagation speed in the transition layer C2, which is the lower layer and contains a larger amount of impurities, is lower than that in the transition layer C1, which is the upper layer. The intervals (time lengths) T1, T2, T3 between the liquid layer A, the transition layer C1, the transition layer C2 are acquired in advance, and are stored in the storage unit 15 as the interval of the reference ultrasonic wave Sa. The position of the interface between the liquid layer A and the sludge layer B is then determined by comparing the interval (time length) T between the primary reflected wave S1 and the secondary reflected wave S2 included in the ultrasonic wave S actually received by the receiver 13, with the intervals (time lengths) T1, T2, T3 of the reference ultrasonic wave Sa.

Figure 3:
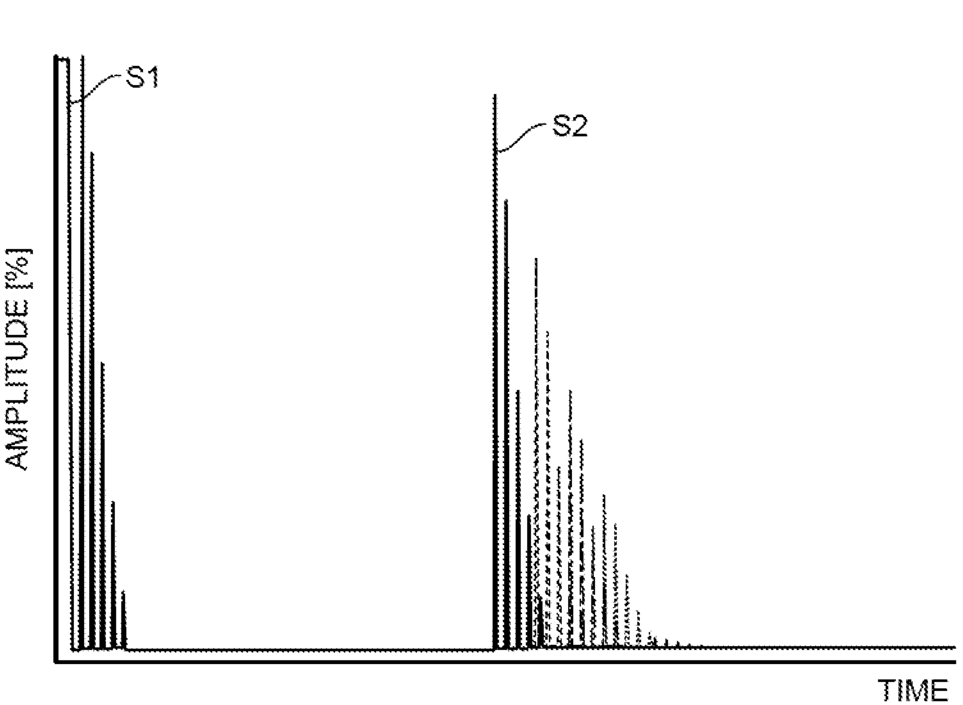
FIG. 3 is a general schematic illustrating a received wave from a water-soluble sludge layer.
Figure 4:
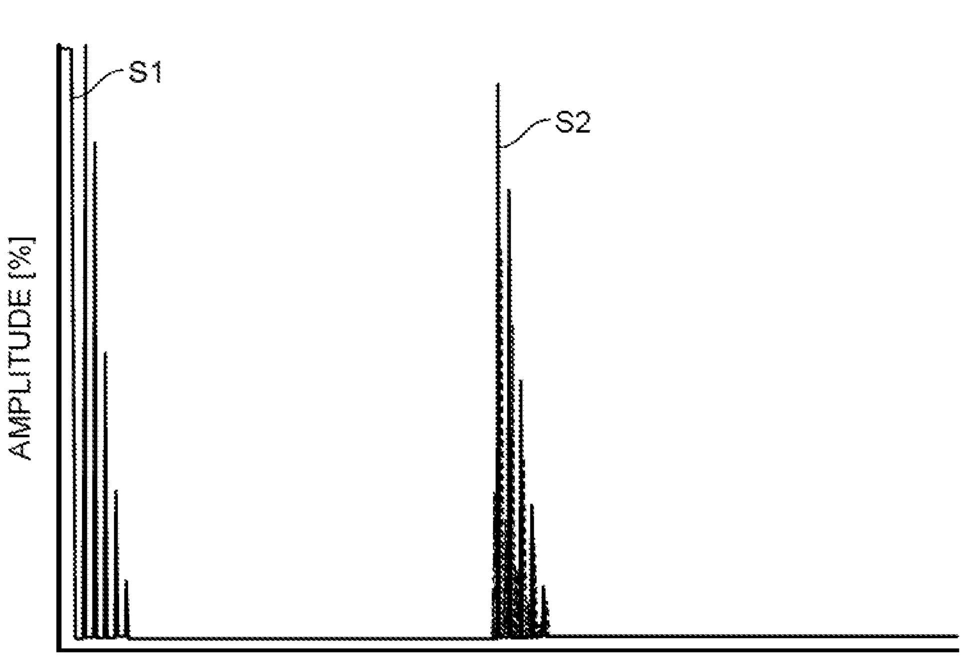
FIG. 4 is a general schematic illustrating a received wave from a water-insoluble sludge layer.

FIG. 3 is a general schematic illustrating a received wave from a water-soluble sludge layer, and FIG. 4 is a general schematic illustrating a received wave from a water-insoluble sludge layer. The water-soluble sludge layer illustrated in FIG. 3 is the sludge layer C1, which is the upper layer, and the water-insoluble sludge layer illustrated in FIG. 4 is the sludge layer C2, which is the lower layer.

Furthermore, the position of the interface between the liquid layer A and the sludge layer B may also be determined based on the level of the secondary reflected wave S2 of the ultrasonic wave S, instead of the interval T between the primary reflected wave S1 and the secondary reflected wave S2 of the ultrasonic wave S. As illustrated in FIG. 3, the level (the magnitude being an amplitude, in this example) of the secondary reflected wave S2 from the transition layer C1, which is the upper layer drops gradually. By contrast, as illustrated in FIG. 4, the level (the magnitude being an amplitude, in this example) of the secondary reflected wave S2 from the transition layer C2, which is the lower layer drops in a shorter time period than that from the transition layer C1, which is the upper layer. These changes in levels are acquired for the transition layer C1 and the transition layer C2 in advance, and stored in the storage unit 15, as the level of the reference ultrasonic wave Sa. The position of the interface between the liquid layer A and the sludge layer B is then determined by comparing the level of the secondary reflected wave S2 of the ultrasonic wave S actually received by the receiver 13, with the level of the reference ultrasonic wave Sa.

In the manner described above, the interface position determining apparatus according to the first embodiment includes the transmitter 12 that transmits an ultrasonic wave S from a plurality of positions in the direction in which the impurities contained in the crude oil (liquid) accumulate, from the outside of the tank 11 serving as a wall surrounding crude oil; the receiver 13 that receives the ultrasonic wave S transmitted from the transmitter 12 at a plurality of positions; and the determining unit that determines the position of the interface between the liquid layer A and the sludge layer B in the accumulating direction, based on the condition of the ultrasonic wave S received by the receiver 13.

Therefore, when the transmitter 12 transmits ultrasonic wave S from a plurality of positions in the direction in which the impurities accumulate, the receiver 13 receives the ultrasonic wave S transmitted from the transmitter 12 at a plurality of positions, and the determining unit 14 determines the position of the interface between the liquid layer A and the sludge layer B in the direction in which the impurities accumulate based on the conditions of the ultrasonic wave S received by the receiver 13. Therefore, the position of the interface between the liquid layer A and the sludge layer B of the crude oil inside of the tank 11 can be detected from the outside highly accurately.

In the interface position determining apparatus according to the first embodiment, the determining unit 14 determines the position of the interface between the liquid layer A and the sludge layer B by comparing the condition of the ultrasonic wave S received by the receiver 13 with the condition of the preset reference ultrasonic wave Sa. Therefore, the position of the interface can be determined easily.

In the interface position determining apparatus according to the first embodiment, the determining unit 14 detects the transition layer C where the liquid is mixed with the impurities, the transition layer C being present between the liquid layer A and the sludge layer B, based on the condition of the ultrasonic wave S received by the receiver 13, and defines the position of the interface between the liquid layer A and the sludge layer B using the transition layer C. Therefore, even when there is the transition layer C between the liquid layer A and the sludge layer B, the position of the interface between the liquid layer A and the sludge layer B can be detected highly accurately.

In the interface position determining apparatus according to the first embodiment, the determining unit 14 determines the position of the interface between the liquid layer A and the sludge layer B by comparing the condition of the ultrasonic wave S received by the receiver 13, with a condition of the preset reference ultrasonic wave Sa corresponding to the transition layer C. Therefore, the position of the interface can be determined easily.

In the interface position determining apparatus according to the first embodiment, the determining unit 14 defines the position of the interface by dividing the transition layer C into a plurality of layers in the direction in which the impurities accumulate. Therefore, the position of the interface can be determined highly accurately.

In the interface position determining apparatus according to the first embodiment, the determining unit 14 determines the position of the interface between the liquid layer A and the sludge layer B, based on at least one of the interval and the level of the acoustic waves received by the receiver 13. Therefore, the position of the interface can be determined easily.

In the interface position determining apparatus according to the first embodiment, a plurality of the transmitters 12 and the receivers 13 are arranged, on the outer surface lid of the tank 11 where the crude oil is stored, at given intervals in the vertical direction. Therefore, the position of the interface can be determined easily within a shorter time period.

In the interface position determining apparatus according to the first embodiment, a plurality of the transmitters 12 and the receivers 13 are arranged, on the outer surface of the tank 11 where the crude oil is stored, at given intervals in the vertical direction. Therefore, the position of the interface can be determined easily within a shorter time period.

The interface position determining apparatus according to the first embodiment includes the display unit 16 that displays that the position of the interface determined by the determining unit 14 reaches an upper bound position preset in the direction in which the impurities accumulate. Therefore, a worker can recognize the operation for cleaning the impurities at an early stage.

Furthermore, an interface position determining method according to the first embodiment includes a step of transmitting an ultrasonic wave S from a plurality of positions in the direction in which the impurities contained in the crude oil (liquid) accumulate, from the outside of the tank 11 serving as a wall surrounding crude oil; a step of receiving the transmitted ultrasonic wave S at a plurality of positions; and a step of determining the position of the interface between the liquid layer A and the sludge layer B in the accumulating direction based on the condition of the received ultrasonic wave S. Therefore, the position of the interface between the liquid layer A and the sludge layer B of the crude oil inside of the tank 11 can be detected from the outside highly accurately.

Second Embodiment

Figure 5:
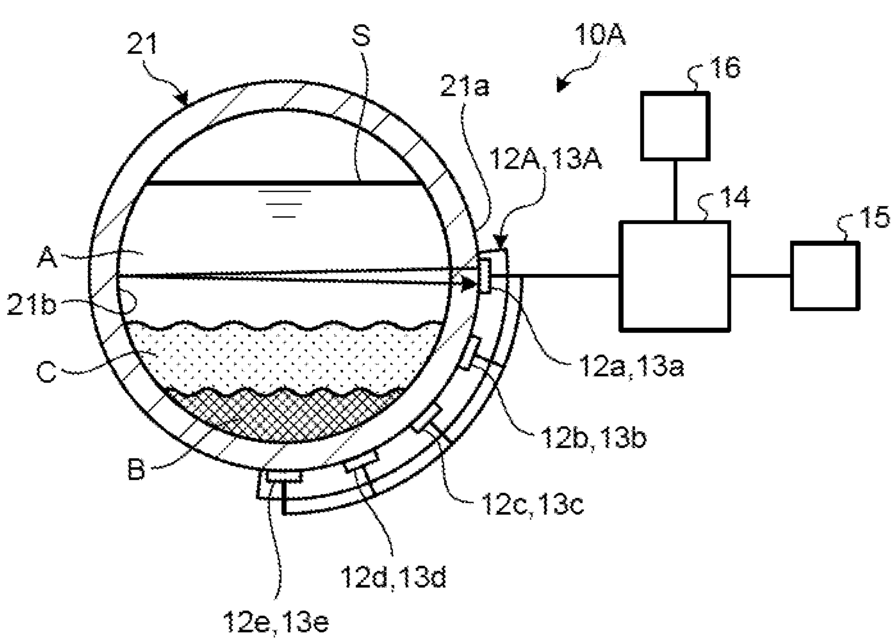
FIG. 5 is a schematic illustrating a general structure of an interface position determining apparatus according to a second embodiment.

FIG. 5 is a schematic illustrating a general structure of an interface position determining apparatus according to a second embodiment. Members having the same functions as those in the embodiment described above are given the same reference signs, and detailed explanations thereof will be omitted.

In the second embodiment, as illustrated in FIG. 5, an interface position determining apparatus 10A is configured to determine a position of the interface between the liquid layer A and the sludge layer B of liquid (such as drainage water) flowing inside of a pipe 21. The interface position determining apparatus 10A then determines the position of the interface between the liquid layer A and the sludge layer B of the drainage water inside the pipe 21, and when the position of the interface reaches a preset given position (height), provides display of carrying out a cleaning operation of the pipe 21.

The pipe 21 has a cylindrical cross-sectional shape, and the drainage water flows therethrough in the direction perpendicular to the paper surface. The interface position determining apparatus 10A includes a transmitter 12A, a receiver 13A, the determining unit 14, the storage unit 15, and the display unit 16. The transmitter 12A includes a plurality of transmitting units 12*a*, 12*b*, 12*c*, 12*d*, 12*e* that are arranged serially, in a manner lined up along a curved line. The transmitter 12A is fixed to the curved outer surface of the pipe 21 along the circumferential direction. At this time, the transmitter 12A has the transmitting units 12*a*, 12*b*, 12*c*, 12*d*, 12*e* arranged along the direction in which the impurities accumulate, at given intervals.

The receiver 13A is provided integrally with the transmitter 12A. In other words, the receiver 13A includes a plurality of receiving units 13*a*, 13*b*, 13*c*, 13*d*, 13*e* arranged serially, in the same manner as the transmitter 12A, in a manner lined up along a curved line. The receiver 13A is fixed to the curved outer surface of the pipe 21 along the circumferential direction. At this time, the receiver 13A has the receiving units 13*a*, 13*b*, 13*c*, 13*d*, 13*e* arranged along the direction in which the impurities accumulate, at given intervals.

The transmitter 12A transmits an ultrasonic wave (acoustic waves) S from a plurality of positions in the direction in which the impurities contained in the drainage water accumulate. The receiver 13A receives the ultrasonic wave S transmitted from the transmitter 12A at a plurality of positions. In other words, the transmitter 12A transmits the ultrasonic wave S from the outside to the inside of the pipe 21, toward a direction perpendicular to the outer surface 21*a*, from a plurality of positions. Part of the ultrasonic wave S is then reflected on the outer surface 21*a*, and the receiver 13A receives ultrasonic wave S reflected on the outer surface as the primary reflected wave. Furthermore, the remaining ultrasonic wave S transmitted from the transmitter 12A passes through the pipe 21, travels straight through the inside, and is reflected on the inner surface 21*b* on the opposite side. The receiver 13A then receives the ultrasonic wave S reflected on the inner surface 21*b*, as the secondary reflected wave.

The determining unit 14 determines the position of the interface between the liquid layer A and the sludge layer B, based on the condition of the ultrasonic wave S received by the receiver 13A. Specifically, the determining unit 14 determines the position of the interface between the liquid layer A and the sludge layer B by comparing the condition of the ultrasonic wave S received by the receiver 13 with the condition of the preset reference ultrasonic wave Sa. The condition of the ultrasonic wave S herein means the interval between the ultrasonic waves S, that is, the interval (time length) between the primary reflected wave and the secondary reflected wave. The condition of the ultrasonic wave S also means the level of the ultrasonic wave S, that, is, the levels (magnitudes) of the primary reflected wave and the secondary reflected wave.

Furthermore, since the drainage water inside the pipe 21 contains impurities, the sludge layer B is gradually formed on the bottom, but intermediate layer (hereinafter, referred to as a transition layer) C where the crude oil is mixed with the impurities is formed between the liquid layer A and the sludge layer B. The determining unit 14 detects the transition layer C that is present between the liquid layer A and the sludge layer B, based on the condition of the ultrasonic wave S received by the receiver 13A, and defines the position of the interface between the liquid layer A and the sludge layer B using the transition layer C. In other words, the determining unit 14 determines the position of the interface between the liquid layer A and the sludge layer B by comparing the condition of the ultrasonic wave S received by the receiver 13A with a condition of the preset reference ultrasonic wave Sa corresponding to the transition layer C.

Since a method for determining the position of the interface between the liquid layer A and the sludge layer B performed by the determining unit 14 is the same as that in the first embodiment, an explanation thereof will be omitted.

In the manner described above, the interface position determining apparatus according to the second embodiment includes: the transmitter 12A that transmits an ultrasonic wave S from a plurality of positions in the direction in which the impurities contained in the drainage water (liquid) accumulate, from the outside of the pipe 21; the receiver 13A that receives the ultrasonic wave S transmitted from the transmitter 12A at a plurality of positions; and the determining unit 14 that determines the position of the interface between the liquid layer A and the sludge layer B in the accumulating direction based on the condition of the ultrasonic wave S received by the receiver 13A.

Therefore, when the transmitter 12A transmits an ultrasonic wave S from a plurality of positions in the direction in which the impurities accumulate, the receiver 13A receives the ultrasonic wave S transmitted from the transmitter 12A at a plurality of positions, and the determining unit 14 determines the position of the interface between the liquid layer A and the sludge layer B in the accumulating direction based on the condition of the ultrasonic wave S received by the receiver 13. Therefore, the position of the interface between the liquid layer A and the sludge layer B of the drainage water inside the pipe 21 can be detected from the outside highly accurately.

In the embodiments described above, the transmitter 12 and the receiver 13 are provided integrally, and the receiver 13 is configured to receive the ultrasonic wave S transmitted from the transmitter 12 and reflected, but it is also possible for the transmitter 12 and the receiver 13 to be positioned in a manner facing each other, and for the receiver 13 to receive the ultrasonic wave S transmitted from the transmitter 12 directly.

Furthermore, in the embodiments described above, the transmitter 12 includes the transmitting units 12*a*, 12*b*, 12*c*, 12*d*, 12*e*, and the receiver 13 is includes the receiving units 13*a*, 13*b*, 13*c*, 13*d*, 13*e*, but the present invention is not limited thereto. For example, one transmitting unit and one receiving unit may be provided, and supported movably in the direction in which the impurities accumulate. In this case, since it is not necessary to provide a plurality of transmitters and a plurality of receivers, it is possible to achieve cost reductions.

Furthermore, in the embodiments described above, the interface position determining apparatus according to the present invention is applied to the tank 11 for crude oil and the pipe 21 for drainage water, but the present invention is not limited thereto, and may be applied to any container storing therein a liquid containing impurities, or any pipe through which liquid containing impurities flows.

Furthermore, in the embodiments described above, the tank (container) 11 or the pipe 21 is used as the wall surrounding the liquid, but the present invention is not limited to such a structure, and may be applied to a container storing therein a liquid or a pipe for guiding flowing liquid, and the present invention is not limited to a container or a pipe having any particular shape.

REFERENCE SIGNS LIST

10 interface position determining apparatus
11 tank (container)
11*d* outer surface
11*e* inner surface
12, 12A transmitter
12*a*, 12*b*, 12*c*, 12*d*, 12*e* transmitting unit
13, 13A receiver
13*a*, 13*b*, 13*c*, 13*d*, 13*e* receiving unit
14 determining unit
15 storage unit
16 display unit
21 pipe
21*a* outer surface
21*b* inner surface
A liquid layer
B sludge layer
C, C1, C2 transition layer
S ultrasonic wave (acoustic wave)
S1 primary reflected wave
S2 secondary reflected wave
Sa reference ultrasonic wave
T, T1, T2, T3 interval

The invention claimed is:

1. An interface position determining apparatus comprising:

a plurality of transmitters that transmit an ultrasonic wave from a plurality of positions in an accumulating direction in which impurities as soil and gravels contained in a liquid accumulate, from an outside of a wall surrounding the liquid and through said wall;

a plurality of receivers that receive the ultrasonic wave transmitted from the plurality of transmitters at a plurality of positions, from an outside of the wall surrounding the liquid and through said wall; and a determining unit that determines a position of an interface between a liquid layer and a sludge layer, in which the impurities are accumulated, in the accumulating direction based on an interval between a primary reflected wave which is a part of the ultrasonic wave, and is a reflected wave of the ultrasonic wave on the outer surface of the wall portions where the plurality of transmitters and the plurality of receivers are arranged without passing through the wall portions and a secondary reflected wave which is a remaining ultrasonic wave, and is a reflected wave of the ultrasonic wave, that has transmitted through the wall portions where the plurality of transmitters and the plurality of receivers, travels straight through the liquid, has not transmitted through the wall portion on the opposite side of the wall portion where it has transmitted, is reflected at the inner surface of the wall portions, and is received by the receiver;

the plurality of the transmitters and the plurality of receivers are arranged at given intervals in the accumulating direction of the impurities;

wherein the determining unit detects a transition layer where the liquid is mixed with impurities, and that is present between the liquid layer and the sludge layer, based on the interval between the primary reflected wave and the secondary reflected wave received by the plurality of receivers, and divides the transition layer into an upper layer C1 existing on the upper side in the accumulating direction and a lower layer C2 existing on the lower side in the accumulating direction relative to the upper layer, to define an interface where the upper layer C1 and the lower layer C2 meet as the position of the interface between the liquid layer and the sludge layer at a position of one of the plurality of receivers in the accumulating deposition direction of the impurities where the transition layer is detected, and the sludge layer, through which the ultrasonic wave does not propagate, is accumulated on a bottom of the wall surrounding the liquid and the liquid layer exists above an upper side of the sludge layer in the accumulating deposition direction.

2. The interface position determining apparatus according to claim 1, wherein the determining unit compares the interval between the primary reflected wave and the secondary reflected wave received by the receiver with an interval between a reference primary reflected wave, which is a reflected wave of a reference acoustic wave on the outer surface of the wall portions without passing through the wall portions and a reference secondary reflected wave, which is a reflected wave of the reference acoustic wave that has passed through the wall portions, on the inner surface, to determine the position of the interface between the liquid layer and the sludge layer.

3. The interface position determining apparatus according to claim 1, wherein the plurality of transmitters and the plurality of receivers are arranged at given intervals in a vertical direction, and the wall portions are wall portions of a container in which the liquid is stored.

4. The interface position determining apparatus according to claim 3, wherein the liquid is crude oil, and the container is a heat exchanger for refining the crude oil.

5. The interface position determining apparatus according to claim 1, wherein the plurality of transmitters and the plurality of receivers are arranged movably along a vertical direction, and the wall portions are wall portions of a container in which the liquid is stored.

6. The interface position determining apparatus according to claim 5, wherein the liquid is crude oil, and the container is a heat exchanger for refining the crude oil.

7. The interface position determining apparatus according to claim 1, wherein the plurality of transmitters and the plurality of receivers are arranged in a circumferential direction, at given intervals, and the wall portions are wall portions of a pipe through which the liquid flows.

8. The interface position determining apparatus according to claim 1, further comprising a display unit that displays that the position of the interface determined by the determining unit has reached an upper bound position preset in the accumulating direction in which impurities accumulate.

9. An interface position determining method comprising:

transmitting an ultrasonic wave from a plurality of positions in an accumulating direction in which impurities contained in a liquid accumulate, from outside a wall surrounding the liquid and through said wall;

receiving the transmitted ultrasonic wave at a plurality of positions, from an outside of the wall surrounding the liquid and through said wall; and determining a position of an interface between a liquid layer and a sludge layer in the accumulating direction based on an interval between a primary reflected wave which is a part of ultrasonic wave, and is a reflected wave of the ultrasonic wave on the outer surface of the wall portions without passing through the wall portions and a secondary reflected wave which is a remaining ultrasonic wave, and is a reflected wave of the ultrasonic wave, that has transmitted through the wall portions where the transmitter and the receiver are arranged, travels straight through the liquid, has not transmitted through the wall portion on the opposite side of the wall portion where it has transmitted, and is reflected at the inner surface of the wall portions, on the inner surface of the wall portions the received ultrasonic wave, wherein determining the position of the interface includes detecting a transition layer where the liquid is mixed with impurities, and that is present between the liquid layer and the sludge layer, based on the interval between the primary reflected wave and the secondary reflected wave received by the a receiver, and dividing the transition layer into an upper layer C1 existing on the upper side in the accumulating direction and a lower layer C2 existing on the lower side in the accumulating direction relative to the upper layer, to define an interface where the upper layer C1 and the lower layer C2 meet as the position of the interface between the liquid layer and the sludge layer at a position of the receiver in the accumulating deposition direction of the impurities where the transition layer is detected, and the sludge layer is a layer of the impurities, as soil and gravels, accumulated, and the sludge layer, through which the ultrasonic wave does not propagate, is accumulated on a bottom of the wall surrounding the liquid and the liquid layer exists above an upper side of the sludge layer in the accumulating deposition direction.

* * * * *